(12) United States Patent
Fukano et al.

(10) Patent No.: US 6,719,268 B2
(45) Date of Patent: Apr. 13, 2004

(54) SOLENOID-OPERATED VALVE

(75) Inventors: Yoshihiro Fukano, Kitasoma-gun (JP);
Tadashi Uchino, Kitasoma-gun (JP)

(73) Assignee: SMC Kabushiki Kaisha, Tokyo (JP)

( * ) Notice: Subject to any disclaimer, the term of this patent is extended or adjusted under 35 U.S.C. 154(b) by 77 days.

(21) Appl. No.: 10/028,081

(22) Filed: Dec. 24, 2001

(65) Prior Publication Data
US 2002/0084435 A1 Jul. 4, 2002

(30) Foreign Application Priority Data
Dec. 28, 2000 (JP) ........................................ 2000-402649

(51) Int. Cl.$^7$ ................................................. F16K 31/02
(52) U.S. Cl. ............... 251/129.17; 251/331; 251/335.2; 277/640
(58) Field of Search ........................ 251/129.16, 129.17, 251/331, 335.2; 277/637, 640

(56) References Cited

U.S. PATENT DOCUMENTS

| | | | |
|---|---|---|---|
| 4,171,792 A | 10/1979 | Bass | |
| 4,304,391 A | * 12/1981 | Yamaguchi | 251/129.05 |
| 4,930,747 A | 6/1990 | Nakamura | |
| 5,535,987 A | 7/1996 | Wlodarczyk | |
| 6,006,728 A | 12/1999 | Matsuda et al. | |
| 6,073,908 A | * 6/2000 | Koga et al. | 251/129.15 |
| 6,352,144 B1 | * 3/2002 | Brooks | 188/267.2 |

FOREIGN PATENT DOCUMENTS

| | | |
|---|---|---|
| DE | 1 196 032 | 7/1965 |
| DE | 295 13 047 U1 | 12/1995 |
| JP | 3-61776 | 3/1991 |
| WO | WO 98/22727 A1 * 5/1998 | F16F/9/53 |

* cited by examiner

*Primary Examiner*—Gene Mancene
*Assistant Examiner*—Patrick Buechner
(74) *Attorney, Agent, or Firm*—Paul A. Guss

(57) ABSTRACT

A solenoid-operated valve comprises first and second elastic ring members each of which is made of an elastic material such as rubber, which retain a peripheral edge of a diaphragm, and which are flexibly bent in accordance with displacement of the diaphragm. A pair of lip sections is formed on the first and second elastic ring members.

10 Claims, 4 Drawing Sheets

PRIOR ART

SOLENOID-OPERATED VALVE

BACKGROUND OF THE INVENTION

1. Field of the Invention

The present invention relates to a solenoid-operated valve which makes it possible to improve the durability of a diaphragm by reducing the load applied to a root portion of the diaphragm for opening/closing a fluid passage.

2. Description of the Related Art

Solenoid-operated valves have been hitherto used, for example, for controlling the flow direction of the compressed air by supplying the compressed air to an actuator or discharging the compressed air to the atmospheric air. The solenoid-operated valve generally adopts the system in which a valve plug is operated by a solenoid (electromagnet).

As shown in FIG. 4, such a solenoid-operated valve concerning the conventional technique comprises a coil housing 4 which includes a fixed iron core 1, a coil 2, and a movable iron core (plunger) 3 arranged therein, and a valve body 8. The valve body 8 is arranged with a diaphragm 7 for opening/closing a valve seat 6 to make communication between a pair of fluid inlet/outlet ports 5a, 5b (see Japanese Laid-Open Patent Publication No. 3-61776).

The diaphragm 7 has a thick-walled section 7a seated on the valve seat 6, and a thin-walled section 7b formed integrally with the thick-walled section 7a. A peripheral edge of the thin-walled section 7b is secured to a recess 9 of the valve body 8.

In this arrangement, when the electric power is applied to the coil 2, the attracting force is generated. The movable iron core 3 is displaced by the attracting force, and thus the diaphragm 7 is operated.

However, in the conventional solenoid-operated valve described above, whenever the diaphragm 7 is displaced integrally with the movable iron core 3 by the magnetically exciting action exerted on the coil 2 or the non-exciting action, the excessive load is applied to the vicinity (root portion) of the peripheral edge secured to the recess 9 of the valve body 8. Therefore, the durability of the diaphragm 7 is extremely deteriorated.

Further, it is preferable to increase the response speed of the solenoid-operated valve by enhancing the attracting force of the coil 2 by increasing the magnetic flux density brought about by the coil 2.

SUMMARY OF THE INVENTION

A general object of the present invention is to provide a solenoid-operated valve which makes it possible to improve the durability of a diaphragm by smoothly operating the diaphragm by reducing the load applied to a root portion of the diaphragm for opening/closing a fluid passage.

A principal object of the present invention is to provide a solenoid-operated valve which makes it possible to increase the response speed by enhancing the attracting force of a coil to be exerted on a movable iron core.

The above and other objects, features, and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

Figure 1:
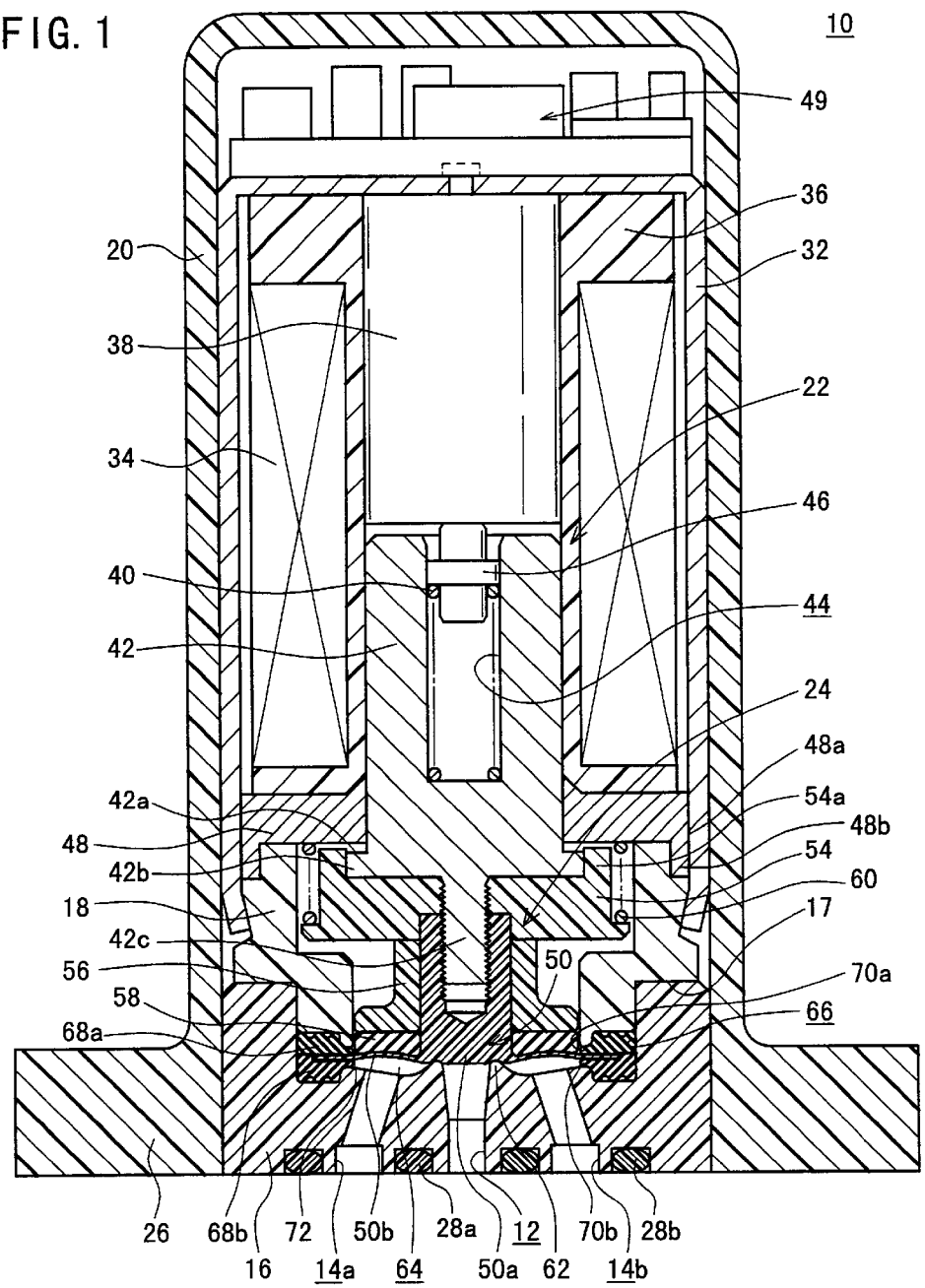
FIG. 1 shows a vertical sectional view taken along an axial direction of a solenoid-operated valve according to an embodiment of the present invention.

With reference to FIG. 1, reference numeral 10 indicates a solenoid-operated valve according to an embodiment of the present invention.

The solenoid-operated valve 10 comprises a first valve body 16 which is formed with a pressure fluid supply port 12 disposed at the center and a pair of pressure fluid discharge ports 14a, 14b adjoining to one another on the right and left with the pressure fluid supply port 12 intervening therebetween, and a second valve body 18 having a substantially cylindrical shape which is integrally connected to an upper portion of the first valve body 16 by an annular step section 17.

The solenoid-operated valve 10 further comprises a bottomed bonnet 20 having a cylindrical shape which is integrally connected to a side surface of the first valve body 16, a solenoid section 22 which is arranged inside of the bonnet 20, and a valve mechanism section 24 which switches the communication state and the non-communication state between the pressure fluid supply port 12 and the pressure fluid discharge ports 14a, 14b by the magnetically exciting action of the solenoid section 22.

A flange section 26 is formed at a lower portion of the bonnet 20. The solenoid-operated valve 10 can be installed to unillustrated another member by inserting bolts (not shown) into unillustrated attachment holes of the flange section 26. Seal members 28a, 28b are attached in the vicinity of the pressure fluid supply port 12 and the pressure fluid discharge ports 14a, 14b.

The solenoid section 22 includes a cap member 32 which is fitted inside of the bonnet 20 and which is formed of a bottomed metal having a cylindrical shape, a bobbin 36 which is arranged inside of the cap member 32 and around which a coil 34 is wound, a fixed iron core 38 which has an end connected to the cap member 32, and a movable iron core 42 which is arranged coaxially with the fixed iron core 38 and which is urged in a direction to separate by the action of the resilient force of a first spring member 40 interposed between the fixed iron core 38 and the movable iron core 42.

An annular projection 42b, which is expanded radially outwardly to have a circumferential surface 42a thereby, is formed at a lower portion of the movable iron core 42. The annular projection 42b is fitted into a recess of a plate-shaped member as described later on. A rod section 42c, which protrudes downwardly, is formed at an end of the movable iron core 42. Further, the movable iron core 42 is formed with a bottomed hole 44 having a cylindrical shape. A slide member 46, which is fastened by the first spring member 40 at one end and which abuts against the fixed iron core 38 at the other end, is provided displaceably in the hole 44.

A ring member 48, which has a hole for inserting the movable iron core 42 thereinto and which is made of metal, is provided under the coil 34 such that the ring member 48 is retained by the cap member 32. A flange section 48b, which has a wide-width outer circumferential surface 48a along the inner wall surface of the cap member 32, is formed on the ring member 48.

A board 49, which includes an excessive excitation circuit, is arranged between the bonnet 20 and the cap member 32. The excessive excitation circuit comprises a CR circuit including a capacitor and a resistor (not shown) which are connected in parallel. The excessive excitation circuit functions to amplify the voltage to be applied to the coil 34.

The valve mechanism section 24 includes a diaphragm 50 made of resin such as fluororesin which comprises a thick-walled section 50a connected to the rod section 42c of the movable iron core 42 and a thin-walled section 50b formed integrally with the thick-walled section 50a; a plate-shaped member 54 which is connected to the lower portion of the movable iron core 42, which is provided to be displaceable integrally with the movable iron core 42, and which is formed with an annular projection 54a to function as a stopper; a displacement member 56 which is installed to the thick-walled section 50a of the diaphragm 50; an elastic member 58 which is interposed between the displacement member 56 and the diaphragm 50 and which is formed of an elastic material such as rubber to protect the thin-walled section 50b thereby; and a second spring member 60 which is interposed between the ring member 48 and the displacement member 56.

The diaphragm 50 is capable of opening/closing a passage 64 for communicating between the pressure fluid supply port 12 and the pressure fluid discharge ports 14a, 14b, as the diaphragm 50 is seated on a seat section 62 formed on the first valve body 16, or the diaphragm 50 is separated from the seat section 62.

A first elastic ring member 68a and a second elastic ring member 68b, each of which is formed of, for example, an elastic material such as rubber, are integrally retained in an annular recess 66 defined by the first valve body 16 and the second valve body 18.

Figure 2:
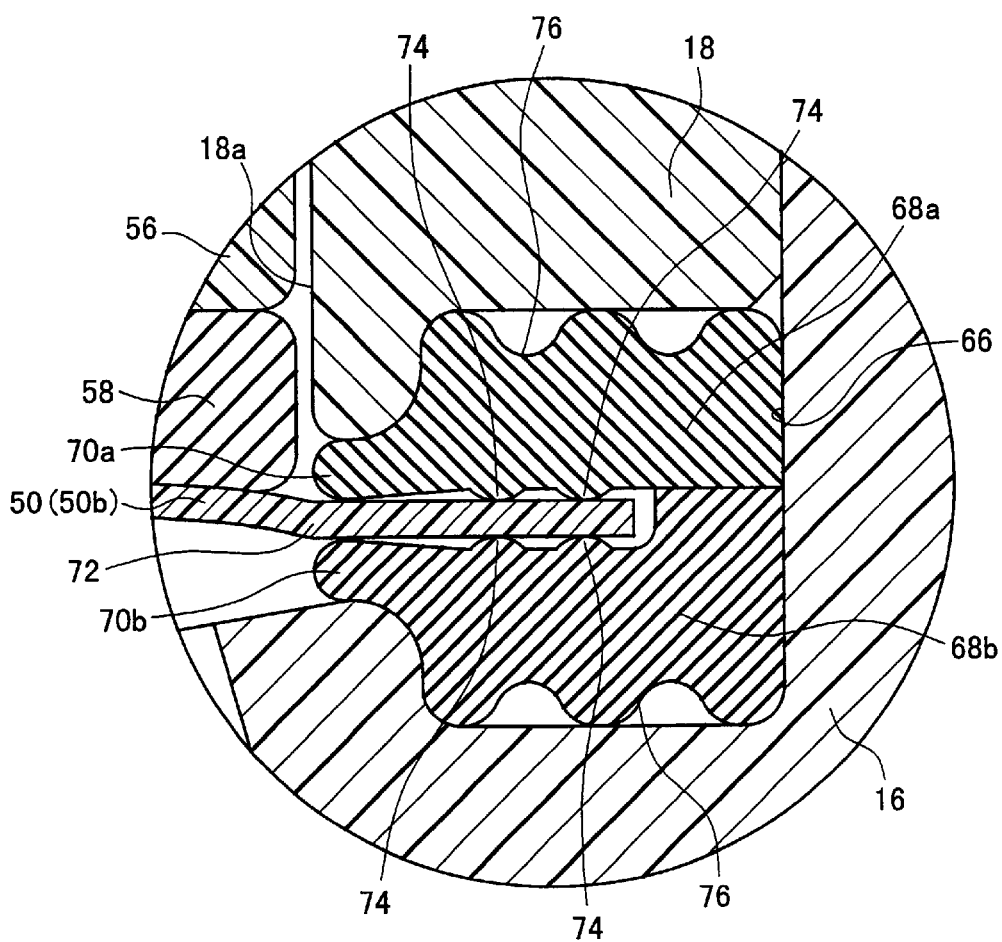
FIG. 2 shows a partially magnified vertical sectional view illustrating a diaphragm shown in FIG. 1.

As shown in FIG. 2, a peripheral edge of the thin-walled section 50b of the diaphragm 50 is interposed between the first elastic ring member 68a and the second elastic ring member 68b. A pair of lip sections 70a, 70b of the first and second ring members 68a, 68b is flexibly bent integrally with the thin-walled section 50b of the diaphragm 50. Accordingly, it is possible to reduce the load on the root portion 72 of the diaphragm 50 retained by the first and second elastic ring members 68a, 68b.

In other words, it is possible to suppress the load applied to the root portion 72 at which the diaphragm 50 is retained, and thus it is possible to improve the durability of the diaphragm 50, by allowing the lip sections 70a, 70b of the first and second elastic ring members 68a, 68b to have the spring property.

Each of the pair of lip sections 70a, 70b has a thin-walled shape protruding by a predetermined length radially inwardly from each of the first and second elastic ring members 68a, 68b retained in the annular recess 66. One end each of the lip sections 70a, 70b is designed to be substantially flush with the inner wall surface 18a of the second valve body 18 disposed on the upper side (see FIG. 2).

As shown in FIG. 2, a plurality of projections 74 are in contact with the peripheral edge of the diaphragm 50 to effect the sealing function. The projections 74 are formed on inner portions of the first and second elastic ring members 68a, 68b. Wave-shaped sections 76, which are formed on the first and second elastic ring members 68a, 68b, function as relieves when the first and second elastic ring members 68a, 68b are retained in the annular recess 66.

The first and second elastic ring members 68a, 68b may be formed in an integrated manner, without forming them separately. The spring force of the second spring member 60 is set to be larger than the spring force of the first spring member 40.

The solenoid-operated valve 10 according to the embodiment of the present invention is basically constructed as described above. Next, its operation, function, and effect will be explained.

FIG. 1 shows the non-excited state in which no current is supplied to the coil 34, illustrating the OFF state in which the diaphragm 50 is seated on the seat section 62, and the communication between the pressure fluid supply port 12 and the pressure fluid discharge ports 14a, 14b is blocked.

Figure 3:
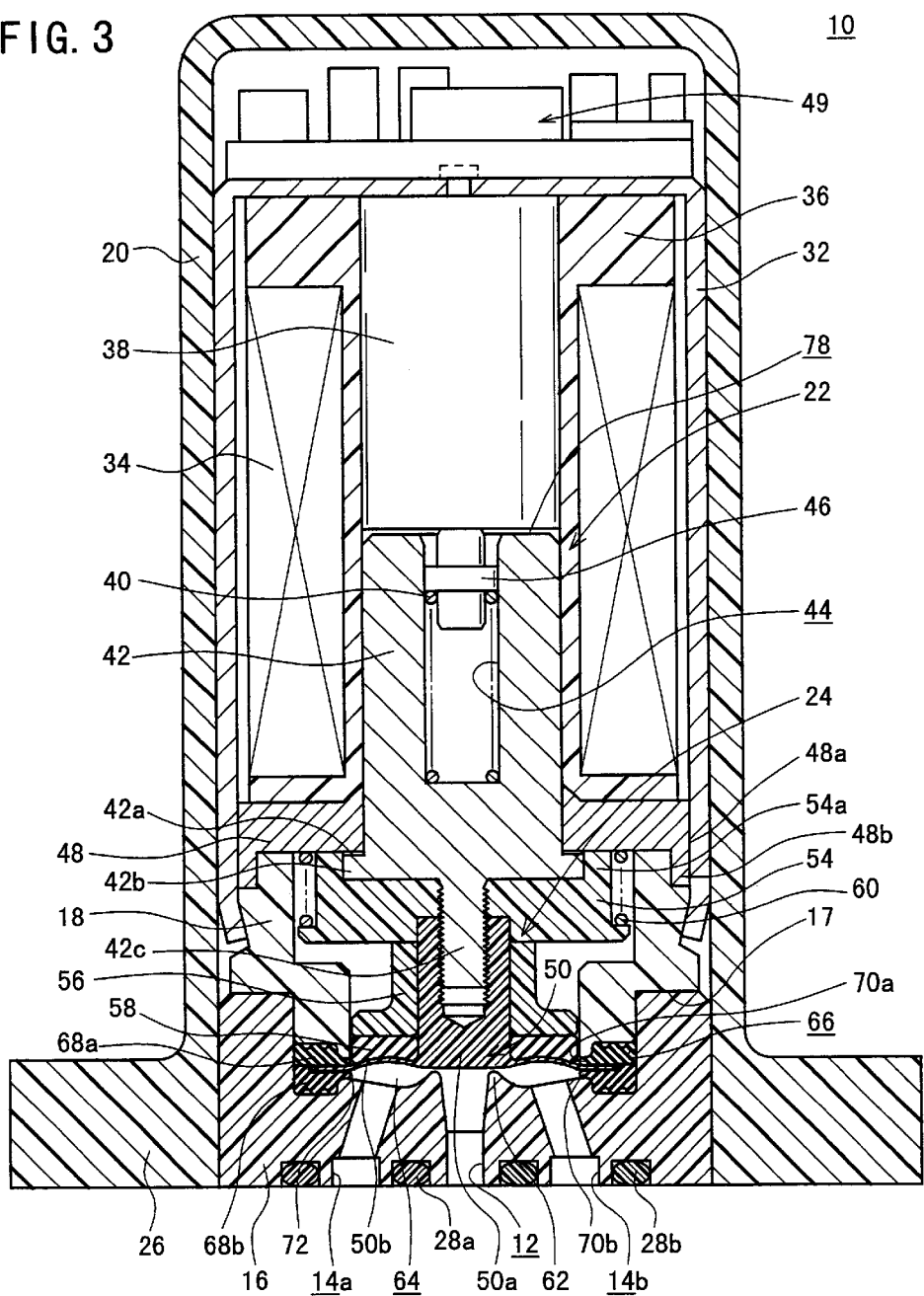
FIG. 3 shows a vertical sectional view illustrating the ON state in which the diaphragm is switched from the OFF state shown in FIG. 1 and is moved upwardly.
Figure 4:
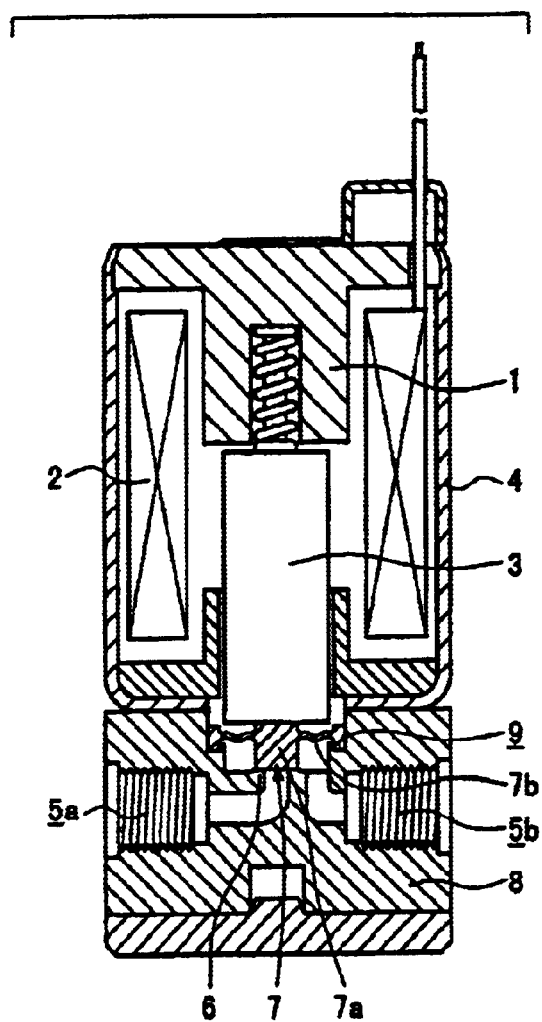
FIG. 4 shows a vertical sectional view illustrating a conventional solenoid-operated valve.

Starting from the OFF state as described above, when an unillustrated power source is energized to apply the electric power to the coil 34, the coil 34 is magnetically excited. The movable iron core 42 is attracted toward the fixed iron core 38 by the magnetically exciting action. As shown in FIG. 3, the solenoid-operated valve 10 is switched from the OFF state to the ON state.

That is, the movable iron core 42 is displaced by a minute distance toward the fixed iron core 38 against the spring force of the first and second spring members 40, 60. The plate-shaped member 54 and the displacement member 56 are moved upwardly integrally with the movable iron core 42. During this process, the annular projection 54a of the plate-shaped member 54, which-functions as the stopper, abuts against the ring member 48. Thus, the displacement terminal end position is given.

Therefore, the diaphragm 50 is separated from the seat section 62 in accordance with the displacement action of the movable iron core 42. Accordingly, as shown in FIG. 3, the ON state is given, in which the pressure fluid supply port 12 is communicated with the pressure fluid discharge ports 14a, 14b. As a result, the pressurized fluid, which is introduced from the pressurized fluid supply port 12, passes through the gap between the diaphragm 50 and the seat section 62. Further, the pressure fluid is supplied to an unillustrated fluid-operated apparatus via the passage 64 and the pressure fluid discharge ports 14a, 14b.

In the embodiment of the present invention, the peripheral edge of the thin-walled section 50b of the diaphragm 50 is interposed between the first elastic ring member 68a and the second elastic ring member 68b each of which is made of an elastic material such as rubber. The pair of lip sections 70a, 70b of the first and second elastic ring members 68a, 68b is flexibly bent integrally with the thin-walled section 50b of the diaphragm 50. Accordingly, it is possible to reduce the load on the root portion 72 of the diaphragm 50 retained by the first and second ring members 68a, 68b.

In other words, the lip sections 70a, 70b of the first and second elastic ring members 68a, 68b function as springs, and are flexible corresponding to the displacement of the thin-walled section 50b of the diaphragm 50. Accordingly, it is possible to suppress the load applied to the root portion 72 at which the diaphragm 50 is retained, and it is possible to improve the durability of the diaphragm 50.

Further, in the embodiment of the present invention, the ring member 48, which is formed with the flange section 48b having the wide-width outer circumferential surface 48a, is provided under the coil 34. Further still, the movable iron core 42 is provided with the annular projection 42b which has the circumferential surface 42a expanded radially outwardly. Accordingly, the magnetic flux density brought about by the coil 34 is increased to successfully enhance the attracting action of the coil 34. As a result, it is possible to increase the response speed of the solenoid-operated valve 10.

In other words, the surface area is increased by the circumferential surface 42a which is formed for the annular projection 42b of the movable iron core 42 made of metal and the outer circumferential surface 48a which is formed for the flange section 48b of the ring member 48 made of metal. Accordingly, the density of the magnetic flux generated by the coil 34 is increased. Thus, it is possible to enhance the attracting force brought about by the coil 34.

When the solenoid section 22 is in the ON state, the minute clearance 78 (see FIG. 3) is formed between the fixed iron core 38 and the movable iron core 42 so that the fixed iron core 38 and the movable iron core 42 are not in contact with each other. The dimension of the movable iron core 42 in the axial direction is set beforehand highly accurately so that the clearance 78 is formed between the fixed iron core 38 and the movable iron core 42 in the ON state.

Therefore, it is possible to avoid any occurrence of abutment sound between the fixed iron core 38 and the movable iron core 42, and thus it is possible to maintain the quietness. Therefore, the solenoid-operated valve 10 according to the embodiment of the present invention can be preferably used in an environment where the quietness must be maintained, such as in hospitals and audio facilities.

The embodiment of the present invention has been explained for the case in which the first and second elastic ring members 68a, 68b for flexibly retaining the peripheral edge of the diaphragm 50 are applied to the solenoid-operated valve 10. However, the present invention is not limited thereto. It is a matter of course that the present invention is additionally applicable to a variety of fluid pressure-operated apparatuses and valves such as pressure-reducing valves arranged with a variety of diaphragms other than the solenoid-operated valve 10.

What is claimed is:

1. A solenoid-operated valve for displacing a diaphragm to function as a valve plug by attracting a movable iron core by a magnetically exciting action of a solenoid section, said solenoid-operated valve comprising:

an elastic ring member formed of an elastic material, said elastic ring member retaining a peripheral edge of said diaphragm, and flexibly bent in accordance with displacement of said diaphragm, wherein a lip section which is flexibly bent in accordance with said displacement of said diaphragm is formed on said elastic ring member.

2. The solenoid-operated valve according to claim 1, wherein said elastic ring member comprises a first elastic ring member and a second elastic ring member, and said peripheral edge of said diaphragm is interposed between said first elastic ring member and said second elastic ring member.

3. The solenoid-operated valve according to claim 2, wherein projections for being in contact with said peripheral edge of said diaphragm are formed on said first elastic ring member and said second elastic ring member.

4. The solenoid-operated valve according to claim 2, wherein respective lip sections, which are flexibly bent in accordance with said displacement of said diaphragm, are formed on said first elastic ring member and said second elastic ring member.

5. The solenoid-operated valve according to claim 2, wherein wave-shaped sections are formed on said first elastic ring member and said second elastic ring member.

6. The solenoid-operated valve according to claim 4, wherein each of said lip sections has a thin-walled shape protruding radially inwardly by a predetermined length from each of said first elastic ring member and said second elastic ring member and said lip sections function as springs.

7. The solenoid-operated valve according to claim 1, wherein a main solenoid-operated valve body is constituted by a first valve body and a second valve body, and said elastic ring member is retained in an annular recess defined by said first valve body and said second valve body.

8. The solenoid-operated valve according to claim 1, wherein a ring member which has a flange section with an outer circumferential surface is provided under said solenoid section, and an annular projection is formed on said movable iron core which has a circumferential surface expanding radially outwardly.

9. The solenoid-operated valve according to claim 2, wherein said first elastic ring member and said second elastic ring member are separated from each other.

10. The solenoid-operated valve according to claim 2, wherein said first elastic ring member and said second elastic ring member are integrally formed.

* * * * *